UNITED STATES PATENT OFFICE.

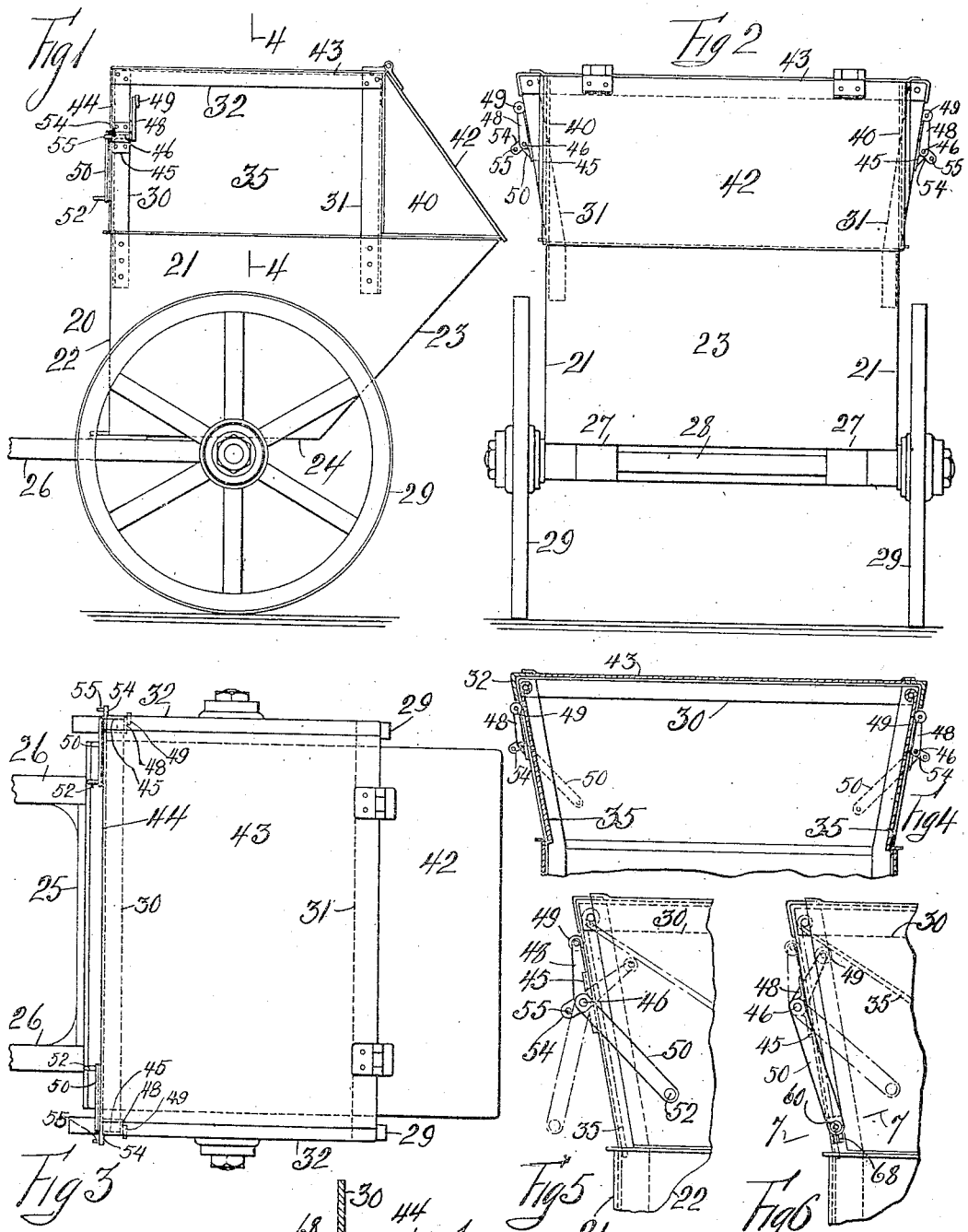

TOM BRABSON, OF BROOKLYN, NEW YORK.

DUMP-CART.

1,251,469.  Specification of Letters Patent.  Patented Jan. 1, 1918.

Application filed March 20, 1915. Serial No. 15,685.

*To all whom it may concern:*

Be it known that I, TOM BRABSON, a citizen of the United States, and a resident of the borough of Brooklyn in the county of Kings and State of New York, have invented certain new and useful Improvements in Dump-Carts, of which the following is a specification.

This invention relates to a dump cart. Its object is the production of a cart which is of very simple construction, durable, and which can be loaded and discharged without spilling any of the material handled and without producing any dust.

In the drawings Figure 1 represents a side elevation of the invention; Fig. 2 is a right hand end view of Fig. 1; Fig. 3 shows a top plan view of Fig. 1; Fig. 4 is a section of Fig. 1 on the line 4, 4; Fig. 5 is an enlarged view of some details; Fig. 6 shows a view similar to Fig. 5 with some parts modified and Fig. 7 is a section of Fig. 6 on the line 7, 7.

The dump cart is shown with a body represented in its entirety by the numeral 20. The body comprises the side walls 21, front wall 22, rear inclined wall 23 and bottom 24. The body 20 is supported on a cross girder 25 from which extend shafts 26. Journal blocks 27 extend from the body 20 and an axle 28 with the wheels 29 is journaled in said blocks. Frames 30 and 31 are secured to the sides 21 of the body 20. Braces 32 connect the frames 30 and 31. Flap doors 35 are pivoted to the frames 30, 31. The frames incline upwardly and outwardly so that the top portions thereof, extend outwardly beyond the planes of the side walls 21. Triangular side plates 40 are fastened to sides 21 and the frames 31. A rear flap door 42 is hinged to the frames 31 and normally bears on the triangular side plates 40 and the rear beveled wall 23. A piece of canvas or other light material is used as a top cover 43 and upper front wall 44. The top cover 43 is fastened to the frames 30, 31 and to the braces 32. The upper front wall 44 is fastened to the frame 30.

Brackets 45 are fastened to the frame 30 and each has pivoted therein a pin 46. An arm 48 carrying the roller 49 is fastened to one end of the pin 46. To the other end of the pin 46 is fastened the arm 50 with the handle 52. An auxiliary bracket 54 is formed with the bracket 45 and carries a stop pin 55.

The parts shown in Fig. 6 are the same as those in Fig. 5, except that the brackets 45 have omitted therefrom the auxiliary brackets 54 with pins 55. In place of the handle 52 there is substituted the handle 60 having the opening 61 for the plunger 62. A spring 64 is located in said opening 61. A plug 65 is fastened in the outer end of the opening 61. The spring 64 bears between said plunger 62 and plug 65. A locking block 68 with a V groove 69 is fastened to the frame 30 and can be engaged by the plunger 62. The lever 50 and roller 49 with their appurtenances constitute locking means for the doors 35.

When it is desired to discharge the contents of the dump cart it is tipped to lower the rear inclined wall 23, and the flap door 42 will automatically open. To load the cart and if a barrel of ashes is to be placed into the cart, the said barrel is raised to bear against either of the flap doors 35. The latter will then swing inwardly to allow the contents of the barrel to enter the cart.

In case it is desired to empty a number of barrels of material into the dump cart, or to load it with an ordinary shovel, one or both of the flap doors are positioned in inclined positions as indicated in Figs. 5 and 6. If the form of locking device shown in Fig. 5 is used the arm 50 is swung down to the position shown in dotted lines until it bears against the stop pin 55, and at the same time the roller 49 of the arm 48 will be brought to bear against its accompanying door 35. By this means the said door will be raised and tilted inwardly as indicated in the dotted lines, and be locked in position. In case the form of locking device shown in Fig. 6 is used the arm 50 is swung down from its raised to its lowered position until the plunger 62 engages the V groove of the locking block 68.

Having described my invention what I desire to secure by Letters Patent and claim is:

In a dump cart the combination of a body, a door for each side of said body, a rear flap door for said body, a locking device for each side door, comprising a bracket extending from said body, a pin pivoted in said bracket, an arm fastened to the pin and carrying a roller to engage its coacting door, a second arm with one end fastened to said pin, an auxiliary bracket on said bracket, a stop pin carried by the auxiliary bracket to engage the second arm to keep the door in an open position.

Signed at the borough of Manhattan, in the county of New York and State of New York, this 11th day of March, A. D. 1915.

TOM BRABSON.

Witnesses:
A. A. DE BONNEVILLE,
JOHN JESSICH.

Copies of this patent may be obtained for five cents each, by addressing the "Commissioner of Patents, Washington, D. C."